T. BELL.
Lifting Ships from the Water.
BEST AVAILABLE COPY
No. 26.
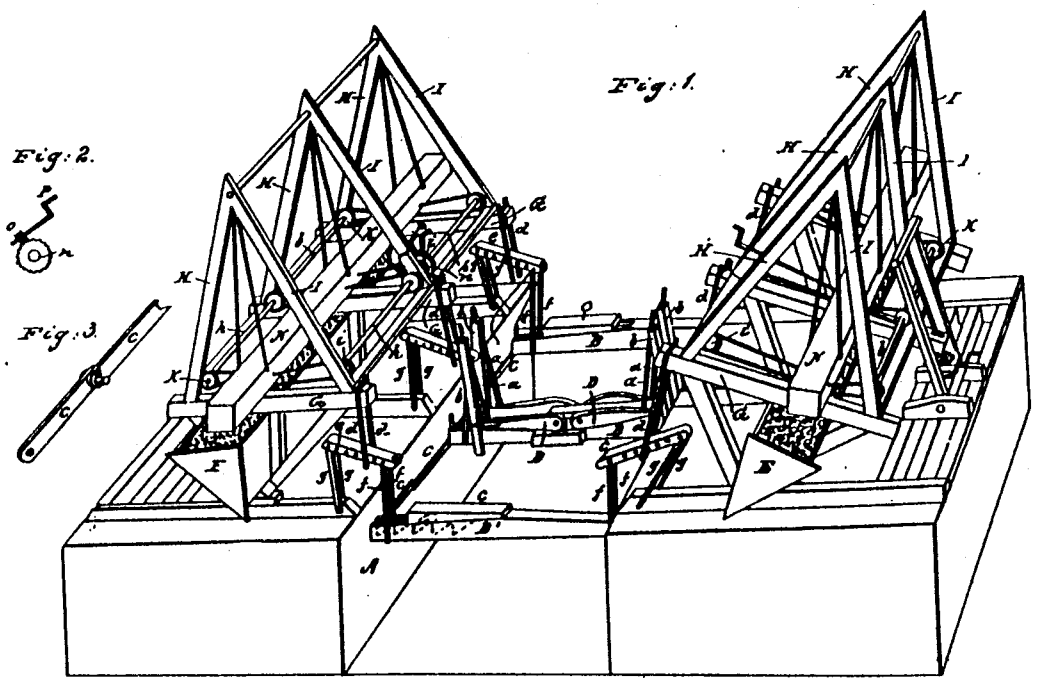
A. I. Patented Sept. 30, 1839.